United States Patent [19]

Yamamoto et al.

[11] Patent Number: 5,210,138
[45] Date of Patent: May 11, 1993

[54] IONOMER COMPOSITION

[75] Inventors: Yoshimasa Yamamoto; Eisaku Hirasawa, both of Ichihara, Japan

[73] Assignee: Dupont-Mitsui Polychemicals Co., Ltd., Tokyo, Japan

[21] Appl. No.: 653,956

[22] Filed: Feb. 12, 1991

[51] Int. Cl.$^5$ .............................................. C08L 35/00
[52] U.S. Cl. ..................................... 525/183; 525/919
[58] Field of Search ................ 525/66, 182, 183, 184, 525/919

[56] References Cited

U.S. PATENT DOCUMENTS 4,410,661 10/1983 Epstein et al. ........................ 525/66
4,839,425 6/1989 Mawatari et al. ..................... 525/92

OTHER PUBLICATIONS

Japanese Abstracts 89-178376/24 Nov. 1987 Hirasawa et al.
Japanese Abstract 84-137466/22 Oct. 1982 Mitsui Polchem.
Japanese Abstract 78-90328A/50 May 1981 Asahi Dorr.

Primary Examiner—Morton Foelak
Assistant Examiner—Shelley A. Dodson
Attorney, Agent, or Firm—Sherman and Shalloway

[57] ABSTRACT

Disclosed is an ionomer composition comprising (A) an ionomer formed by neutralizing a carboxyl group of an ethylene/unsaturated carboxylic acid copolymer with an transition metal cation, (B) a polyamide and (C) a polyamide oligomer having a terminal group of the molecule chain blocked with a primary amino group. Since two polyamide components differing in the degree of polymerization are incorporated in this ionomer composition, excellent characteristics of the ionomer resin are related in the ionomer composition, and the mechanical strength at high temperatures, the formability and the transparency are prominently improved.

21 Claims, No Drawings

IONOMER COMPOSITION

BACKGROUND OF THE INVENTION (1) Field of the Invention

The present invention relates to an ionomer composition having an excellent mechanical strength at high temperatures.

More particularly, the present invention relates to an ionomer composition having an excellent mechanical strength at high temperatures, which is modified with at least two polyamide components different in the degree of polymerization. (2) Description of the Related Art A so-called ethylenic ionomer resin formed by neutralizing at least a part of the carboxyl group in an ethylene/unsaturated carboxylic acid copolymer is excellent in toughness, elasticity, bending resistance, wear resistance, impact resistance and weatherability, and this ionomer resin is used for molded articles such as automobile parts, golf balls, ski shoes, shoe soles and tools by utilizing these excellent properties. Furthermore, by utilizing excellent transparency, drawability, heat sealability, oil resistance and sanitary characteristics, the ionomer resin is widely used in the field of packaging, for example, as coextrusion films, packaging skins and laminated films.

In these application fields, the ionomer resin is processed by extrusion molding or injection molding, and since the binding power of the metal ion crosslinking is weakened by heating, the ionomer resin shows an excellent melt flowability and can be processed easily like ordinary thermoplastic resins. This is another characteristic feature of the ionomer resin.

However, since the mechanical strength of the ionomer resin is drastically reduced at temperatures higher than the melting point thereof, it sometimes happens that deformation or breaking is caused at secondary processing or during use. For example, when the ionomer resin is used for packaging a food to be retorted, deformation or partial breaking of the film is caused by heat at the retort treatment, or fusion breaking is caused at a sealed portion at the heat-sealing step. Furthermore, in the field of automobile parts, the ionomer resin involves a problem in that deformation is caused relatively easily by heat from the engine or by direct rays of the sun.

Therefore, the application range of the ionomer resin is drastically restricted though it has the abovementioned excellent properties.

Accordingly, it has been eagerly desired to improve the mechanical strength of the ionomer resin at high temperatures while retaining the above-mentioned excellent properties of the ionomer resin.

As one method for improving the mechanical strength of an ethylenic ionomer resin at high temperatures, there is known a process in which a thermoplastic resin having a high melting point, such as a polyamide resin, is blended (see, for example, Japanese Examined Patent Publication No. 56-22468). According to this process, however, no satisfactory effect is attained unless the high melting-point resin component in present in an amount of at least 30%, and therefore, the process is economically disadvantageous and excellent characteristics possessed by the ionomer resin are degraded or lost. Reduction of the transparency is especially conspicuous.

We previously proposed a process in which 3 to 20% by weight of a polyamide oligomer having a primary amino group at one terminal is copoymerized to an ethylenic ionomer (see Japanese Unexamined Patent Publication No. 59-71378) and a process in which an ethylenic ionomer is ion-crosslinked with a polyamide oligomer having a primary amino group at both the terminals (Japanese Patent Application No. 62-294329). These processes are advantageous in that the mechanical strength of the obtained ionomer composition at high temperatures is improved by restraint of the molecular motion. However, it sometimes happens that processing become difficult because of reduction of the melt flowability, or the drawability and surface gloss inherently possessed by the ionomer are degraded. Furthermore, the improvement of the mechanical strength is due mainly to the thermal creep characteristics, and the improvement of the resistance to deformation by the gravity is not conspicuous.

SUMMARY OF THE INVENTION

We made research with a view to developing a technique of imparting to an ethylenic ionomer resin an excellent mechanical strength at high temperatures, as possessed by an ionomer resin ionically crosslinked with a polyamide oligomer having a primary amino group at the terminal, without degradation of excellent properties of the ethylenic ionomer, such as excellent transparency, drawability, adhesiveness, heal sealability and molding processability, and as the result, we found that the foregoing problem can be solved by an ionomer composition comprising an ethylenic ionomer component and at least two polyamides differing in the degree of the polymerization. The present invention has now been completed based on this finding.

It is therefore a primary object of the present invention to solve the problems involved in industrial working of the conventional techniques and provide an ionomer composition having a high mechanical strength at high temperatures, a good easy processability to a molded article and a good appearance of a molded article while retaining excellent properties of an ethylenic ionomer resin, such as excellent transparency, heat bondability, heat sealability and oil resistance.

More specifically, in accordance with the present invention, there is provided an ionomer composition comprising (A) an ionomer resin having at least a part of the carboxyl group of an ethylene/unsaturated carboxylic acid copolymer neutralized with a transition metal cation. (B) a polyamide resin, and (C) a polyamide oligomer having a primary amino group at one or both of the terminals and an average degree of polymerization of 5 to 35, wherein the amounts of the components (A), (B) and (C) satisfy the following requirements:

$$\frac{(A)}{(A) + (B) + (C)} \times 100 = 50 \text{ to } 95,$$

$$\frac{(B) + (C)}{(A) + (B) + (C)} \times 100 = 50 \text{ to } 5 \text{ and}$$

$$\frac{(C)}{(A) + (B) + (C)} \times 100 = 30 \text{ to } 3.$$

The ionomer composition of the present invention is prominently characterized in that two polyamide components (B) and (C) differing in the degree of polymerization are used as the polyamide.

For example, when the polyamide oligomer (C) is blended into the ionomer resin (A), the primary amino group present at the terminal of the polyamide oligomer (C) coordinates with the carboxylic salt of the ionomer resin to form an amine complex salt or reacts with the carboxyl group to form an ammonium salt, whereby the polyamide oligomer (C) is bonded to the ionomer resin (A).

In a molded body of this ionomer composition, the mechanical strength at high temperatures is improved by restraint of the molecular motion, but processing sometimes becomes difficult because of reduction of the melt flowability. On the other hand, when the polyamide resin (B) is blended into the ionomer resin (A), by introduction of the high-melting-point component, the mechanical strength at high temperatures can be improved in the obtained ionomer composition, but in this case, the transparency is degraded.

In contrast, if both of the components (B) and (C) are simultaneously blended, degradation of the transparency is controlled and the processability is improved. It is construed that the reason why reduction of the transparency is controlled in the present invention is that the polyamide oligomer acts as a compatibilizing agent and the dispersion state of the polyamide resin is microscopically uniformalized. Furthermore, it is construed that the reason why the processability is improved in the present invention is that the polyamide resin having no capacity of forming a complex with the ionomer component acts as a plasticizer.

According to the present invention, by using the components (B) and (C) in combination, the mechanical strength at high temperatures is further improved by the polymer alloy effect, as compared with the mechanical strength attained by the single use of the component (B) or (C).

As is seen from the foregoing description, according to the present invention, without an expensive apparatus or a special step, the mechanical strength at high temperatures of the ionomer, the processability into a molded body such as a film and the appearance of the molded body can be improved while retaining excellent properties of the ionomer, such as excellent heat sealability, high heat bondability, high oil resistance, reduced smell and high impact resistance.

DETAILED DESCRIPTION OF THE INVENTION

Ionomer Resin (A)

As the unsaturated carboxylic acid of the ethylene/unsaturated carboxylic acid copolymer in the component (A) of the present invention, there can be used unsaturated carboxylic acids having 3 to 8 carbon atoms, such as acrylic acid, methacrylic acid, itaconic acid, maleic anhydride, monomethyl maleate and monoethyl maleate. Of these unsaturated carboxylic acids, acrylic acid and methacrylic acid are especially preferably used.

In the ethylene/unsaturated carboxylic acid copolymer, the unsaturated carboxylic acid content is 3 to 15 mole%, preferably 5 to 15 mole%, especially preferably 6 to 15 mole%. If the unsaturated carboxylic acid content is lower than 3 mole%, the compatibility with the polyamide components (B) and (C) described hereinafter and the transparency are often degraded.

The ethylene/unsaturated carboxylic acid copolymer can be further copolymerized with up to 13 mole%, especially up to 10 mole%, of a third component, so long as the attainment of the intended object of the present invention is not hindered.

As the third component, there can be used unsaturated carboxylic acid esters such as ethyl acrylate, isobutyl acrylate, n-butyl acrylate and methyl methacrylate, and vinyl esters such as vinyl acetate.

As the transition metal cation for the production of the ionomer resin (A), at least one member selected from the group consisting of $MN^{++}$, $Co^{++}$, $Ni^{++}$, $Cu^{++}$, $Zn^{++}$ and $Pb^{++}$ is used, and $Zn^{++}$ is especially preferably used. The ionomer resin neutralized with such a metal cation having a coordination bondability reacts with the polyamide oligomer having a primary amino group at the terminal to form an ammine complex salt or an ammonium salt, and the mechanical strength at high temperatures of the obtained ionomer composition is drastically improved.

The degree of neutralization with the transition metal ion in the ionomer resin (A) is preferably 5 to 100%, especially preferably 10 to 90%. It is preferred that the melt flow rate of the ionomer resin (A) as measured at a temperature of 230° C. under a load of 2160 g be 0.01 to 500 g/10 min, especially 0.05 to 100 g/10 min.

Polyamide Resin (B)

A molding grade polyamide resin is used as the component (B) in the present invention. Such polyamide resins are generally obtained by polycondensation of a dicarboxylic acid such as oxalic acid, adipic acid, sebacic acid, terephthalic acid, isophthalic acid or 1,4-cyclohexylidicarboxylic acid with a diamine such as ethylenediamine, tetramethylenediamine, pentamethylenediamine, hexamethylenediamine, decamethylenediamine, 1,4-cyclohexyldiamine or m-xylylenediamine, ring-opening polymerization of a cyclic lactam such as ε-caprolactam or ω-laurolactam, polycondensation of an aminocarboxylic acid such as 6-aminocaproic acid, 9-minononanoic acid, 11-aminoundecanoic acid or 12-aminododecanoic acid, and copolymerization of a cyclic lactam as mentioned above with a dicarboxylic acid and a diamine. Polyamides marketed under tradenames of Nylon 6, Nylon 66, Nylon 610, Nylon 11, Nylon 12, Copolymerized Nylon, Nylon MXD6 and Nylon 46 can be used singly or in the form of mixtures of two or more of them. A polyamide elastomer comprising a polyether group or polyester group formed of polyoxyethylene, polyoxypropylene or polyoxytetramethylene, which is included as the soft segment into a part of the polymer chain, can also be used as the polyamide resin (B). A polyamide resin having a number average molecular weight of at least 8,000, especially 10,000 to 40,000, is preferably used.

Polyamide Oligomer

A polyamide oligomer having a primary amino group at one or both of ends of the polyamide chain and an average degree of polymerization of 5 to 35, preferably 10 to 30, is used as the component (C) in the present invention.

This polyamide oligomer can be obtained by blocking molecule ends of an oligomer of a cyclic lactam or aminocarboxylic acid with a primary amino group. Polycaprolactam or polylaurolactam is especially preferably used as the polyamide oligomer.

In other words, the polyamide oligomer used in the present invention can be obtained by using a primary amine or a primary diamine as the terminal blocking agent (polymerization degree-adjusting agent) at the polymerization. When a primary amine is used, a polyamide oligomer having a primary amino group bonded to one terminal of the polyamide chain is obtained, and when a primary diamine is used, a polyamide oligomer having a primary amino group bonded to both the terminals of the polyamide chain is obtained. As the primary amine, there can be mentioned n-butylamine, n-amylamine, n-hexylamine and cyclohexylamine, and n-butylamine is especially preferably used. As the primary diamine, there can be mentioned m-xylenediamine, hexamethylenediamine, 1,3-bisaminomethylcyclohexane, ethylenediamine, butylenediamine and 3,3-diamino-N-methyldipropylamine, and m-xylenediamine is especially preferably used.

If the terminal amino group of the polyamide oligomer is a secondary or tertiary amino group, the reactivity of the caboxyl salt of the ionomer having at least a part of the carboxyl group in the ethylene/unsaturated carboxylic acid copolymer neutralized with the transition metal cation is poor and no modifying effect is attained.

In the present invention, it is important that the average degree of polymerization of the polyamide oligomer should be in the range of from 5 to 35, and it is especially preferred that a polyamide oligomer having an average degree of polymerization of 10 to 30 be used, though the preferred average degree of polymerization differs to some extent according to the carbon number of the lactam or aminocarboxylic acid as the monomer. If the average degree of polymerization is lower than 3, the melting point of the polyamide oligomer is drastically lowered, and the effect of improving the mechanical strength at high temperatures of the resultant molded body is drastically reduced. If the average degree of polymerization of the polyamide oligomer is higher than 35, the activity of the terminal amino group of the polyamide oligomer is reduced and the capacity of forming complex by coordination with the carboxylic salt of the ionomer is lowered, and the mechanical strength at high temperatures of the obtained molded body is not improved at all.

The above-mentioned polyamide oligomers can be used singly or in the form of mixtures of two or more of them.

Preparation of Composition

The ionomer composition of the present invention can be obtained by melt-kneading components (A), (B) and (C) at a temperature of 150 to 320° C., preferably 200 to 300° C. The melt kneading is accomplished by using a resin melt-mixing apparatus or processing apparatus such as a screw extruder, a Banbary mixer and a roll mixer, and a screw extruder is preferably used.

In the present invention, the component (A) is used in an amount of 50 to 95 parts by weight, preferably 60 to 90 parts by weight, the component (B) is used in an amount of 2 to 40 parts by weight, preferably 5 to 35 parts by weight, and the component (C) is used in an amount of 3 to 30 parts by weight, preferably 5 to 25 parts by weight, per 100 parts by weight of the sum of the amounts of the components (A), (B) and (C).

If the amount of the component (A) is smaller than 50 parts by weight, the excellent characteristics of the ionomer resin are degraded, and if the amount of the component (A) exceeds 95 parts by weight, no modifying effect can be attained by the addition of the polyamide components. If the amount of the component (C), which is usually handled in the powdery state, exceeds 30 parts by weight, kneading in the melt-kneading apparatus becomes difficult.

Furthermore, the ionomer composition of the present invention can be prepared by adding the above-mentioned components (B) and (C) at the step of neutralizing the ethylene/unsaturated carboxylic acid copolymer with the transition metal cation to effect ionization of the carboxyl group, complex-forming reaction with the polyamide oligomer and blending of the polyamide resin simultaneously.

Ionomer Composition

The obtained ionomer composition has a melt flow rate (MFR) of 0.005 to 100 g/10 min as measured at 230° C. under a load of 2160 g. If MFR is lower than 0.005 g/10 min, molding becomes extremely difficult. If MFR exceeds 100 g/10 min, the mechanical strength at high temperatures is not substantially improved.

Additives such as an antioxidant, an ultraviolet absorber, a coloring agent, a stabilizer, a lubricant and a tackifier can be incorporated into the ionomer composition of the present invention according to need.

A molded body obtained by using the ionomer composition of the present invention is excellent in the mechanical strength at high temperatures and also excellent in the inherent properties of the ionomer, such as transparency, drawability, oil resistance and adhesiveness. Accordingly, the ionomer composition of the present invention can be preferably used for the preparation of films, sheets and automobile parts.

EXAMPLES

The present invention will now be described in detail with reference to the following examples that by no means limit the scope of the present invention.

Test methods adopted for determining the properties of the molded body formed of the ionomer composition of the present invention are described below.

Melting Point and MFR

The crystal melting point was measured as the melting point by the DSC method, and the melt flow rate (MFR) was measured at 230° C. under a load of 2160 g according to JIS K-7210.

Heat Distortion Resistance Test

One end of a test piece of the ionomer composition of the present invention having a length of 100 mm, a width of 20 mm and a thickness of 3 mm was horizontally attached to a fixing stand having a height of 100 mm, and the test piece was allowed to stand still for 2 hours in an oven adjusted at a predetermined temperature. By this heat treatment, the other end of the test piece was hung down to the height of x mm by heat and gravity. The deformation ratio was calculated from the deformation quantity }(100 − x) mm} according to the formulation formula:

$$\text{deformation ratio (\%)} = \frac{100 - x}{100} \times 100$$

The temperature causing deformation of 20% was read from the graph illustrating the relation between the deformation ratio and the temperature, and this temperature was designated as the gravity deformation temperature and used as the criterion indicating the heat distortion resistance.

Transparency

The transparency was evaluated by the visual observation.

Tensile Test

According to JIS K-7113, the tensile strength of the film in the machine direction and the elongation were measured at a pulling speed of 500 mm/min.

Ethylenic ionomers, polyamide resins and polyamide oligomers used in examples and comparative examples are shown in Table 1 through 3.

EXAMPLES 1 THROUGH 4 AND COMPARATIVE EXAMPLES 1 THROUGH 8

In a single-screw extruder (screw diameter=30 mm, L/D=32), an ionomer component, a polyamide oligomer component and a polyamide resin component were mixed at a ratio shown in Table 4 and the mixture was kneaded and extruded at a resin temperature of 230° C. and an extrusion speed of 2.0 kg/hr. While the strand from the extruder was still in the melted state, the extrudate was molded into a sheet having a thickness of 3 mm by a heating press-molding machine, and the transparency and heat distortion resistance were evaluated. The obtained results are shown in Table 4.

The ionomer compositions obtained in Examples 1 through 4 were highly improved in the heat distortion resistance over the compositions of Comparative Examples 1 through 3 not containing the polyamide resin component and polyamide oligomer. Furthermore, the ionomer compositions of Examples 1 through 4 are excellent in the transparency and heat resistance over the compositions of Comparative Examples 4 through 6 not containing the polyamide oligomer component. The composition of Comparative Example 7 not containing the polyamide resin component was insufficient in the melt flowability though excellent in the transparency. The composition of Comparative Example 8 where the total amount of the polyamide components exceeded 50 parts by weight was poor in the transparency though the composition was excellent in the heat resistance.

TABLE 1

| Kind of Ionomer | Composition of Copolymer | Kind of Ion | Methacrylic Acid Content (mole %) | Neutralization Degree (%) | MFR (g/10 min) |
|---|---|---|---|---|---|
| ionomer 1 | ethylene/methacrylic acid copolymer | Zn | 12.2 | 40 | 0.4 |
| ionomer 2 | | Zn | 7.5 | 60 | 2.5 |
| ionomer 3 | | Zn | 5.4 | 60 | 6.5 |
| ionomer 4 | | Zn | 12.2 | 30 | 1.2 |

TABLE 2

Polyamide Resins' (abbreviated to "PA") used in Examples and Comparative Examples

| Polyamide Resin | Monomer | Melting Point (°C.) | Tradename | Manufacturer |
|---|---|---|---|---|
| PA-1 | ε-caprolactam | 225 | AMILAN ® CM1017C | TORAY |
| PA-2 | ω-laurolactam and tetramethylene glycol | 168 | PEBAX ® 5533 | ATOCHEM |

TABLE 3

Polyamide Oligomers (abbreviated to "PAO") Used in Examples and Comparative Examples

| Polyamide Oligomer | Monomer | Average Degree of Polymerization | Terminal Groups | Terminal-Blocking Agent | Melting Point (°C.) |
|---|---|---|---|---|---|
| PAO-1 | ε-caprolactam | 18 | —NH$_2$<br>—CO—NH—R | n-butylamine | 213 |
| PAO-2 | | | —NH$_2$<br>—NH$_2$ | m-xylenediamine | 205 |

TABLE 4

Physical Properties of Compositions

| | Composition | Transparency | Gravity Deformation Temperature (°C.) | MFR (g/10 min) |
|---|---|---|---|---|
| Example No. | | | | |
| 1 | ionomer 1/PA-1/PAO-1 = 70/20/10 | transparent | 185 | 0.3 |
| 2 | ionomer 2/PA-1/PAO-1 = 70/20/10 | transparent | 107 | 0.2 |
| 3 | ionomer 3/PA-1/PAO-1 = 80/15/5 | transparent | 82 | 0.8 |
| 4 | ionomer 3/PA-2/PAO-2 = 80/15/5 | transparent | 83 | 0.05 |
| Comparative Example No. | | | | |
| 1 | ionomer 1 | transparent | 78 | 0.4 |
| 2 | ionomer 2 | transparent | 70 | 2.5 |
| 3 | ionomer 3 | substantially | 71 | 6.5 |
| 4 | ionomer 1/PA-1 = 70/30 | slightly hazy | 130 | 0.05 |
| 5 | ionomer 2/PA-1 = 70/30 | slightly hazy | 80 | 0.7 |
| 6 | ionomer 3/PA-1 = 80/20 | slightly hazy | 78 | 3.0 |
| 7 | ionomer 3/PAO-2 = 90/10 | transparent | 82 | no-flow |
| 8 | ionomer 1/PA-1/PAO-1 = 49/41/10 | opaque | >200 | 0.3 |

EXAMPLES 5 THROUGH 7 AND COMPARATIVE EXAMPLES 9 THROUGH 14

In a twin-screw screw extruder (screw diameter=29 mm, L/D=25), an ionomer component, a polyamide oligomer component and a polyamide component were mixed at a ratio shown in Table 5 and melt-kneaded and pelletized at a resin temperature of 240° C. The pelletized ionomer composition was shaped into a film having a thickness of 100 μm by using an inflation molding machine (die diameter=50 mm, screw diameter =30 mm, L/D =28), and the transparency and tensile characteristics were examined. The obtained results are shown in Table 5.

Films of the ionomer compositions of Examples 5 through 7 were improved in the tensile strength and elongation over films of Comparative Examples 9 through 11 not containing the polyamide oligomer component and polyamide resin component. Furthermore, the films of the compositions of Examples 5 through 7 were excellent over films of Comparative Examples 12 through 14 not containing the polyamide oligomer component in the transparency, tensile strength and elongation.

TABLE 5

| | Physical Properties of Films | | | |
|---|---|---|---|---|
| | Composition | Transparency | Tensile Strength (Kgf/cm$^2$) | Elongation (%) |
| Example 5 | ionomer 2/PA-1/PAO-1 = 70/20/10 | transparent | 517 | 320 |
| Example 6 | ionomer 3/PA-1/PAO-1 = 70/20/10 | substantially transparent | 449 | 330 |
| Example 7 | ionomer 4/PA-1/PAO-1 = 70/20/10 | transparent | 656 | 353 |
| Comparative Example 9 | ionomer 2 | transparent | 380 | 230 |
| Comparative Example 10 | ionomer 3 | transparent | 354 | 310 |
| Comparative Example 11 | ionomer 4 | transparent | 530 | 258 |
| Comparative Example 12 | ionomer 2/PA-1 = 70/30 | substantially transparent | 441 | 288 |
| Comparative Example 13 | ionomer 3/PA-1 = 70/30 | slightly hazy | 349 | 310 |
| Comparative Example 14 | ionomer 4/PA-1 = 70/30 | substantially transparent | 616 | 325 |

We claim:

1. An ionomer composition comprising (A) an ionomer resin having at least a part of the carboxyl group of an ethylene/unsaturated carboxylic acid copolymer neutralized with a transition metal cation, in an amount of 50 to 95 parts by weight, (B) a polyamide resin having a number average molecular weight of at least 8000, in an amount of 2 to 40 parts by weight, and (C) a polyamide oligomer having a primary amino group at one or both of the terminals and an average degree of polymerization of 5 to 35, in an amount of 3 to 30 parts by weight, and the amount of (B)+(C) equals 5 to 50 parts by weight of the composition, per 100 parts by weight of the sum of the amounts of the compounds A, B and C.

2. An ionomer composition as set forth in claim 1, wherein the number average molecular weight of the polyamide resin (B) is in the range of from 10,000 to 40,000.

3. An ionomer composition as set forth in claim 1, wherein one terminal of the polyamide chain of the polyamide oligomer is blocked with a primary amine.

4. An ionomer composition as set forth in claim 3, wherein the primary amine is n-butylamine.

5. An ionomer composition as ser forth in claim 1, wherein both the terminals of the polyamide chain of the polyamide oligomer are blocked with a primary diamine.

6. An ionomer composition as set forth in claim 5, wherein the primary diamine is m-xylenediamine.

7. An ionomer composition as set forth in any of claims 3 through 6, wherein the polyamide oligomer (C) has an average polymerization degree of from 10 to 30.

8. An ionomer composition as set forth in claim 1, wherein the degree of neutralization of the ionomer resin (A) with the transition metal cation is 5 to 100%.

9. An ionomer composition as set forth in claim 8, wherein the degree of neutralization of the ionomer resin (A) with the transition metal cation is 10 to 90%.

10. An ionomer composition as set forth in claim 8 or 9, wherein the transition metal cation is at least one member selected from the group consisting of $Mn^{++}$, $Co^{++}$, $Ni^{++}$, $Cu^{++}$, $Zn^{++}$, and $Pb^{++}$.

11. An ionomer composition as set forth in claim 10, wherein the transition metal cation is $Zn^{++}$.

12. An ionomer composition as set forth in claim 1, wherein the ethylene/unsaturated acid copolymer in the ionomer resin (A) has an unsaturated carboxylic acid content of 3 to 15 mole%.

13. An ionomer composition as set forth in claim 12, wherein the unsaturated carboxylic acid has 3 to 8 carbon atoms.

14. An ionomer composition as set forth in claim 1, wherein the amounts of the components (A), (B) and (C) are 60 to 90 parts by weight, 5 to 35 parts by weight and 5 to 25 parts by weight, respectively, based on the sum of the amounts of the components (A), (B) and (C).

15. An ionomer composition as set forth in claim 1, wherein the melt flow rate is in the range of from 0.005 to 100 g/10 min as measured at a temperature of 230° C. under a load of 2160 g.

16. An ionomer composition comprising (A) an ionomer resin having at least a part of the carboxyl group of an ethylene/unsaturated carboxylic acid copolymer neutralized with a transition metal cation, in an amount of 60 to 90 parts by weight, (B) a polyamide resin having a number average molecular weight of 10,000 to 40,000, in an amount of 5 to 35 parts by weight, and (C) a polyamide oligomer having a primary amino group at one or both of the terminals and an average degree of polymerization of 10 to 30, in an amount of 5 to 25 parts by weight, and the amount of (B) + (C) equals 5 to 50 parts by weight of the composition, per 100 parts by weight of the sum of the amounts of the compounds A, B and C.

17. An ionomer composition as set forth in claim 16, wherein one terminal of the polyamide chain of the polyamide oligomer is blocked with n-butylamine.

18. An ionomer composition as set forth in claim 16 wherein both the terminals of the polyamide chain of the polyamide oligomer are blocked with m-xylenediamine.

19. An ionomer composition as set forth in claim 16 wherein the degree of neutralization of the ionomer resin (A) with the transition metal cation is 10 to 90%.

20. An ionomer composition as set forth in claim 19, wherein the transition metal cation is $Zn^{++}$.

21. An ionomer composition as set forth in claim 16, wherein the ethylene/unsaturated acid copolymer in the ionomer resin (A) has an unsaturated carboxylic acid content of 3 to 15 mole% and the unsaturated carboxylic acid has 3 to 8 carbon atoms.

* * * * *